(No Model.)
W. DE MEZA.
DUST PAN.
No. 268,636. Patented Dec. 5, 1882.
Fig. 1.
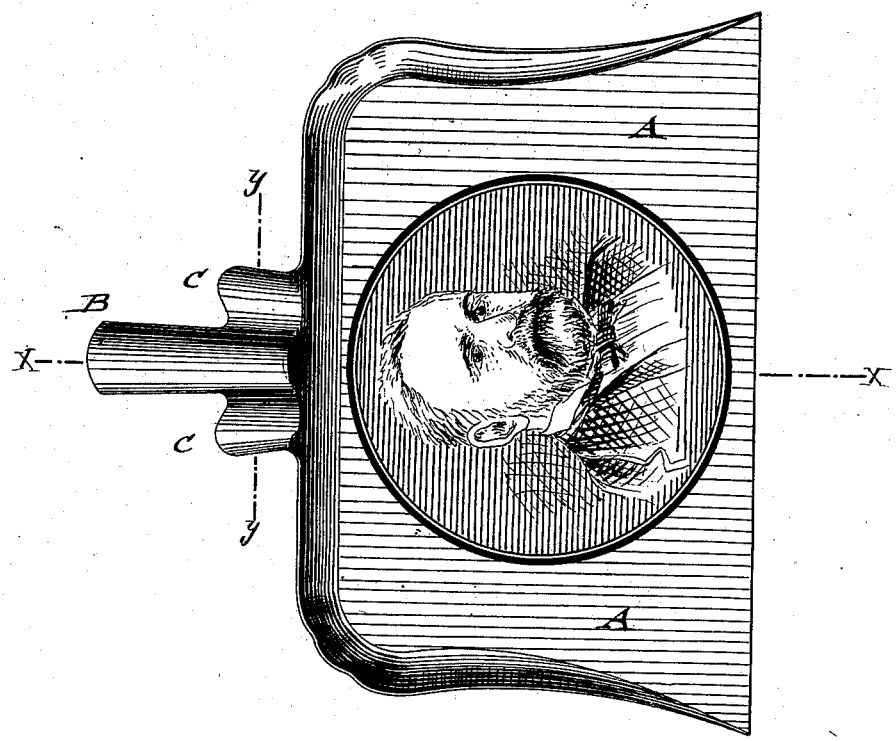
Fig. 2.
Fig. 3.
WITNESSES:
Jos. N. Rosenbaum.
Carl Karr
INVENTOR
Wilson de Meza
BY Paul Goepel
ATTORNEY

UNITED STATES PATENT OFFICE.

WILSON DE MEZA, OF NEW YORK, N. Y., ASSIGNOR TO DONALDSON BROTHERS, OF SAME PLACE.

DUST-PAN.

SPECIFICATION forming part of Letters Patent No. 268,636, dated December 5, 1882.

Application filed November 3, 1882. (No model.)

*To all whom it may concern:*

Be it known that I, WILSON DE MEZA, of the city, county, and State of New York, have invented certain new and useful Improvements in Dust-Pans, of which the following is a specification.

My invention relates to that class of scoops or shovels with short handles in which are embraced coal-shovels, sugar-scoops, dust-pans, &c.; and it has for its object to provide an article which may be given away or sold to customers, and serve both as an article of use and as an advertisement.

My invention consists of a dust-pan or other shaped scoop made of pasteboard and stamped in one piece with its handle, and having at the point of connection of the handle and pan lateral wings or extensions integral therewith, and serving as braces to the handle.

In the accompanying drawings, Figure 1 represents a plan, Fig. 2 a vertical longitudinal section, of my improved dust-pan on line *x x*, Fig. 1; and Fig. 3, a detail vertical transverse section on line *y y*, Fig. 1.

Similar letters of reference indicate corresponding parts.

In the drawings, A represents a dust-pan stamped out of one piece of pasteboard, together with a handle, B, of convexo-concave form, to give it rigidity.

To impart additional strength to the handle at its connection with the pan, lateral wings or extensions C C, integral with the handle and pan, are provided, which wings are preferably fluted or corrugated, so as to give greater stiffness to that part. By means of the wings or braces, as described, the handle is prevented from becoming limp, and is serviceable in using the pan.

I am aware that shovels or pans stamped up in one piece with a convexo-concave handle are well known, and I therefore do not claim the same, broadly.

Having thus described my invention, I claim as new and desire to secure by Letters Patent—

1. A dust-pan struck up with its handle from one piece of pasteboard, and having lateral wings or braces integral therewith at the point of connection with the handle and pan, substantially as shown and described.

2. A dust-pan, of pasteboard, struck up in one piece with a handle of convexo-concave form, and having laterally-extended fluted wings or braces at the point of connection of the handle with the pan, substantially as shown and described.

In testimony that I claim the foregoing as my invention I have signed my name in presence of two subscribing witnesses.

WILSON DE MEZA.

Witnesses:
PAUL GOEPEL,
SIDNEY MANN.